(12) United States Patent
Wipf (10) Patent No.: US 9,604,792 B2
(45) Date of Patent: Mar. 28, 2017

(54) DEVICE FOR TRANSFERRING PRODUCTS FROM A FEEDER CONVEYOR BELT TO A DISCHARGE CONVEYOR BELT USING GRIPPERS, AND METHOD FOR OPERATING THE DEVICE

(75) Inventor: Alfred Wipf, Jestetten (DE)

(73) Assignee: Robert Bosch GmbH, Stuttgart (DE)

(*) Notice: Subject to any disclaimer, the term of this patent is extended or adjusted under 35 U.S.C. 154(b) by 1059 days.

(21) Appl. No.: 13/258,652

(22) PCT Filed: Feb. 24, 2010

(86) PCT No.: PCT/EP2010/052342
§ 371 (c)(1),
(2), (4) Date: Dec. 22, 2011

(87) PCT Pub. No.: WO2010/108750
PCT Pub. Date: Sep. 30, 2010

(65) Prior Publication Data
US 2012/0085623 A1    Apr. 12, 2012

(30) Foreign Application Priority Data
Mar. 23, 2009   (DE) .................. 10 2009 001 746

(51) Int. Cl.
*B65G 47/91* (2006.01)
*B65G 47/08* (2006.01)
(Continued)

(52) U.S. Cl.
CPC ......... *B65G 47/915* (2013.01); *B65G 47/082* (2013.01); *B65G 47/843* (2013.01); *B65G 47/244* (2013.01)

(58) Field of Classification Search
USPC .... 198/370.01, 370.03, 370.05, 370.12, 375, 198/408, 426, 428, 459.1, 468.4, 471.1,
(Continued)

(56) References Cited

U.S. PATENT DOCUMENTS 1,887,211 A * 11/1932 Mortimer .................. 198/471.1
3,920,128 A * 11/1975 Baker ........................... 414/737
(Continued)

FOREIGN PATENT DOCUMENTS

| CN | 1950261 | 4/2007 |
|---|---|---|
| DE | 202005013799 | 12/2005 |

(Continued)

OTHER PUBLICATIONS

PCT/EP2010/052342 International Search Report.

*Primary Examiner* — Leslie A Nicholson, III
(74) *Attorney, Agent, or Firm* — Michael Best & Friedrich LLP (57) ABSTRACT

The invention relates to a device for transferring products from a feeder conveyor belt (10) to a discharge conveyor belt (12), comprising a linear motor having conveyor elements (14) which are movably guided on a guide and have grippers (18) for the temporary accommodation of products (20). The guide is designed as a linear guide section (13), and the conveyor elements (14) can be moved back and forth on the guide section (13) for picking up and putting down the products (20). When products (20) are conveyed consecutively in a row in the conveying direction (z) of the feeder conveyor belt (10), the feeder conveyor belt (10), the discharge conveyor belt (12) and the guide section (13) are arranged in parallel next to one another, at least in one lateral overlapping area. When products (20) are conveyed side-by-side in rows in the conveying direction (z) of the feeder conveyor belt (10), the feeder conveyor belt (10) is arranged perpendicular to the discharge conveyor belt (12), and the discharge conveyor belt (12) and the guide section (13) are arranged in parallel to one another and are arranged side-by-side with the feeder conveyor belt (10) at least in a lateral overlapping area.

20 Claims, 9 Drawing Sheets

(51) Int. Cl.
 *B65G 47/84* (2006.01)
 *B65G 47/244* (2006.01)

(58) Field of Classification Search
 USPC ........ 198/610, 750.12, 750.14, 803.3, 803.4,
  198/803.5, 867.01, 867.03
 See application file for complete search history.

(56) References Cited

U.S. PATENT DOCUMENTS

| | | | | |
|---|---|---|---|---|
| 4,164,296 | A | * | 8/1979 | Trees ........................ 414/416.02 |
| 4,611,705 | A | * | 9/1986 | Fluck .......................... 414/798.9 |
| 5,636,726 | A | * | 6/1997 | Nield ............................ 198/430 |
| 5,921,375 | A | * | 7/1999 | van Laar ..................... 198/471.1 |
| 6,540,063 | B1 | | 4/2003 | Fallas et al. |
| 7,134,258 | B2 | | 11/2006 | Kalany et al. |

FOREIGN PATENT DOCUMENTS

| | | |
|---|---|---|
| DE | 202007019906 | 4/2007 |
| EP | 1123886 | 8/2001 |
| EP | 1801044 | 6/2007 |
| JP | 2000185823 | 7/2000 |
| JP | 2004196389 | 7/2004 |
| JP | 2005104555 | 4/2005 |
| WO | 03047977 | 6/2003 |

\* cited by examiner

DEVICE FOR TRANSFERRING PRODUCTS FROM A FEEDER CONVEYOR BELT TO A DISCHARGE CONVEYOR BELT USING GRIPPERS, AND METHOD FOR OPERATING THE DEVICE

BACKGROUND OF THE INVENTION

The present invention relates to a device for transferring products from a feeder conveyor belt to a discharge conveyor belt, comprising a linear motor with conveyor elements, which are guided displaceably on a guide and have grippers for temporarily picking up products. A method for operating the device also lies within the scope of the invention.

Conventional belt systems are generally used for supplying products, for example chocolate bars which have already been packaged, to a tube packaging machine to produce a multipack. Said belt systems take over the products from the outlet belt of a tube packaging machine, rotate said products, form a short product jam to buffer small fluctuations in the speed, accelerate the products to the speed of the subsequent packaging machine and finally synchronize said products with the feed chain of said machine. A similar problem exists when delivering products from a product array in order to supply said products individually to a tube packaging machine. In this case too, the products are removed from the product array by means of a delivery station, which consists especially of a belt system provided with a switch, and are then aligned, backed up, separated and accelerated by means of a plurality of belts, and synchronized with the packaging machine and passed to the feed chain of the packaging machine. Said systems consist of a multiplicity of belts and thus rapidly reach a length of up to 10 m.

The above problems can be solved more compactly by using a feed system consisting of circulating, individual linear motor carriages which grip the products and deposit them directly into the feed chain. In this case, the products can be rotated during the transport path, and synchronization can take place directly by specific acceleration or braking of the individual products in their carriages. Systems of this type are known, for example from U.S. Pat. No. 7,134,258 and EP-A-1 123 886.

Disadvantages of this system include the large outlay associated with the circulating linear motor carriages. The feeding of vacuum for gripping the products to a circulating system is demanding, and a large and expensive linear motor section is required for the forward movement and return movement and the two deflections. Also, the carriages which are in circulation at a particular instant are not available, this increasing the number of carriages required and additionally increasing the cost of the system. Furthermore, the deflecting sections are realized only by means of additional technical outlay, since the narrow motor gap required on the deflecting sections between the fixed primary part and moving secondary part of the carriages cannot be ensured. In addition, the circulation requires a comparatively large radius, which makes the entire system have a large overall volume.

Furthermore, products can also be placed into the feed chain of a packaging machine by means of a pick and place robot. The disadvantages here include the fact that a vision system, with which the robot can identify the products, is generally required, and the low capacity of approximately 100 products/minute which can be achieved by a robot. In general, however, capacities of 400-800 products/minute are sought, which requires a large number of robots and therefore causes high costs and requires a large amount of space.

Groups may also be formed by means of a grouping device, such as a "dancer chain" and transferred by means of a two-axle robot with a multipicker—a "top loader". The space required and the technical outlay are also large here and the flexibility is restricted.

SUMMARY OF THE INVENTION

The invention is based on the object of developing a device of the type mentioned at the beginning in such a manner that the disadvantages and costs attached to the linear systems with circulating carriages that are known from the prior art are dispensed with.

The object is achieved according to the invention in that the guide is designed as a linear guide section, and the conveyor elements are displaceable to and fro on the guide section for picking up and depositing the products, and, when products are supplied consecutively in a line in the conveying direction of the feeder conveyor belt, the feeder conveyor belt, the discharge conveyor belt and the guide section are arranged parallel next to one another, at least in a lateral overlapping region, and, when products are supplied in rows next to one another in the conveying direction of the feeder conveyor belt, the feeder conveyor belt is arranged perpendicularly to the discharge conveyor belt, and the discharge conveyor belt and the guide section are arranged parallel to each other and are arranged next to each other together with the feeder conveyor belt, at least in a lateral overlapping region.

The grippers are preferably arranged on a pivoting arm, which is arranged on the conveyor elements, in order to produce a displacement movement transversely with respect to the conveying direction. The pivoting arm is expediently configured here to execute a pivoting movement which reduces the required movement distance of the conveyor elements for picking up and depositing the products.

The grippers may be pivoted, raised and lowered simultaneously via a common drive, in particular via a common driving link. However, the grippers may also be controlled individually via dedicated drives in order to execute pivoting, lifting and displacement movements.

Displacement and pivoting movements may also be produced by further linear motors or additional displacement elements. For example, a gripper can be connected to at least two displacement elements via scissors-type kinematics.

In a preferred method for operating a device according to the invention, in order to increase the capacity of the device, the movement distances of the conveyor element from product pick up positions to product depositing positions and back are shortened by an overlapping arrangement of a product pick up region and a product depositing region. For optimum operation, the product pick up region and the product depositing region have an arrangement deviating slightly from symmetry.

Since there is no circulation, the conveyor elements have to move to and fro between gripping and depositing positions. This would normally lead to a sharp limitation of the production capacity of the system, since some time is required until the conveyor elements, after depositing the products, are available again to pick up new products.

However, said waiting times can be minimized by a skillful arrangement, which is explained in more detail further below with reference to FIG. 3, of the product pick up and depositing positions and by the proposed construction of the conveyor elements:

The depositing section can be arranged in relation to the pick up section in such a manner that the conveyor elements only have to execute a minimum movement such that the conveyor elements, after depositing the product, are rapidly available again at the pick up position. The capacity here is determined by the two outermost conveyor elements which have to cover the greatest distance in order to form the product groups. In this case, the conveyor element which carries out the grouping movement in a direction opposed to the product flow direction has to perform an additional reversal of movement and is subjected to the heaviest load. The optimum arrangement of the pick up and depositing regions is therefore not symmetrical but rather is displaced slightly in the direction of the conveyor element which is subjected to a heavier load such that said conveyor element only has to cover a shorter distance. In an optimum arrangement, the pick up and depositing regions are brought into overlap such that, for example, in the situation in which the pick up and depositing flow are directed in the same direction, the final conveyor element can briefly move backwards during the transformation and is therefore already close again to the pick up position, and the first conveyor element only has to move a little downstream. In this case, the arrangement can be optimized by analysis of the cycle times of the first and of the last conveyor element. This optimization is all the more important the greater the difference in the group width between the pick up and depositing arrangement.

Particularly small distances can also be achieved if the pick up and depositing directions are arranged in counter-flow, since, in this case, the depositing can take place when all of the conveyor elements are in the return movement to the pick up position. This alternative is advantageous in particular when the products are picked up and deposited approximately at the same distance.

Pivoting devices can be attached to the conveyor elements, said pivoting devices, in addition to the transport of the products transversely with respect to the pick up or depositing direction, rotating the products through, for example, 90°.

By means of suitable activation of the conveyor elements, empty points in the product feed can be closed such that, even if a product stream has gaps, every depositing position is filled with a product. For this purpose, when an empty point occurs, a conveyor element waits until the next position in the feed, which is provided with a product, comes into the pick region thereof. The further conveyor elements correspondingly grip products at later positions. Similarly, products which are identified as being defective cannot be transferred and packaged since they are jumped over in the same manner as an empty point.

Further advantageous refinements of the device according to the invention and of the method according to the invention are the subject matter of dependent claims.

The advantages arising inter alia with the device according to the invention include:
  compact structure
  defined, gentle, minimum product handling
  no circulation of the conveyor elements necessary
  only a comparatively short linear motor module
  low number of conveyor elements required
  cost-effective in comparison to circulating alternative
  more flexible and compact than conventional alternative
  products are centered at maximum capacity
  the depositing speed can be adapted to the following machine
  empty points can be compensated for
  automatic product rearrangement
  automatic group rearrangement
  only non-defective packages are conveyed
  minimum maintenance, good accessibility

BRIEF DESCRIPTION OF THE DRAWINGS

Further advantages, features and details of the invention emerge from the description below of preferred exemplary embodiments and with reference to the drawing which serves merely for explanation and should not be interpreted as being limiting. The drawing shows schematically in FIG. 1 a simplified illustration of a first arrangement for transferring products from a feeder conveyor belt to a discharge conveyor belt.

DETAILED DESCRIPTION

Figure 1:
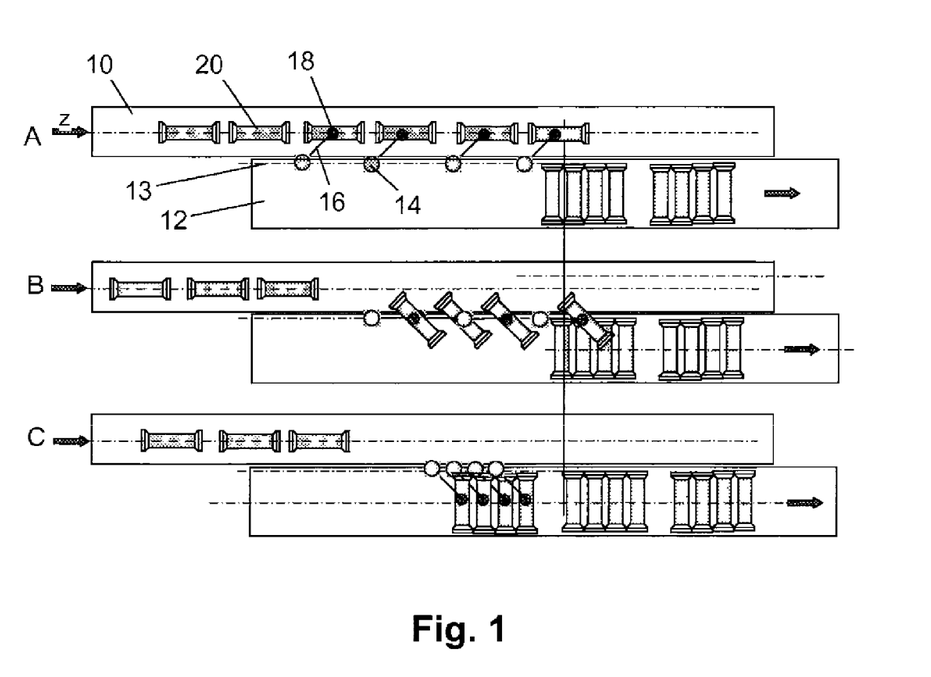

An arrangement shown in FIG. 1 shows a feeder conveyor belt 10 moving continuously in the direction of the arrow, and a discharge conveyor belt 12 which is arranged parallel to the former and moves continuously in the direction of the arrow. The two conveyor belts 10, 12 lie next to each other and form a lateral overlapping region. A linear motor with a linear guide section 13 as a guide for conveyor elements 14, which can be displaced to and fro in a controlled manner parallel to the conveyor belts 10, 12 on the guide section 13, is arranged in said overlapping region. Each conveyor element 14 is equipped with a pivoting arm 16 and a gripper 18 which is arranged at the free end of the pivoting arm 16 and is in the form of a vacuum-controlled suction cup. In the arrangement shown, the linear motor is equipped with four conveyor elements 14 which can be activated independently of one another.

Packages 20—In The Present Example Tubular Packages which are arranged consecutively in a line are transported on the feeder conveyor belt 10. In this case, the feeder conveyor belt 10 corresponds, for example, to a delivery belt for delivering the packages 20 from a tube packaging machine. The conveyor elements 14 use the grippers 18 thereof to simultaneously raise four tubular packages 20 from the feeder conveyor belt 10 (A), and the pivoting arms 16 are pivoted at the same time through 90° (B) and the conveyor elements 14 are moved toward one another in such a manner that the tubular packages 20, which are now aligned in parallel and perpendicularly to the conveying direction of the discharge conveyor belt 12, are in contact laterally. The four tubular packages 20 forming one row are deposited onto the discharge conveyor belt (C) and, for example, supplied to a further tube packaging machine for the packaging of every four tubular packages in a multipack.

Figure 2:
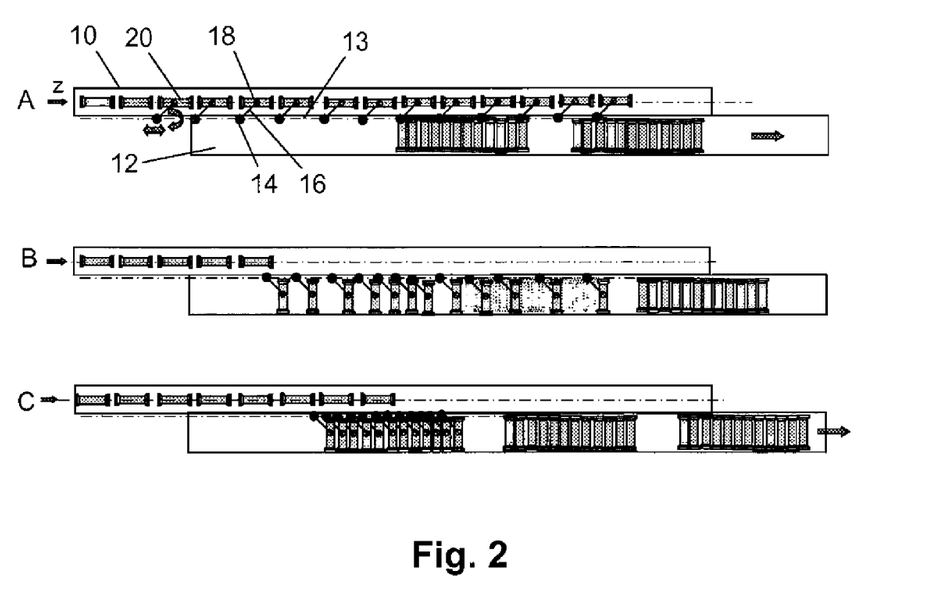
FIG. 2 a simplified illustration of a second arrangement for transferring products from a feeder conveyor belt to a discharge conveyor belt.

An arrangement shown in FIG. 2 substantially corresponds to the above-described arrangement of FIG. 1. The linear motor is equipped here with 12 conveyor elements 14. The conveyor elements 14 use the grippers 18 thereof to simultaneously raise 12 tubular packages 20 from the feeder conveyor belt 10 (A), the pivoting arms 16 are simultaneously pivoted through 90° (B) and the conveyor elements 14 are moved toward one another in such a manner that the tubular packages 20, which are now aligned in parallel and perpendicularly to the conveying direction of the discharge conveyor belt 12, are laterally in contact. The twelve packages 20 forming a row are deposited onto the discharge conveyor belt (C).

Figure 3:
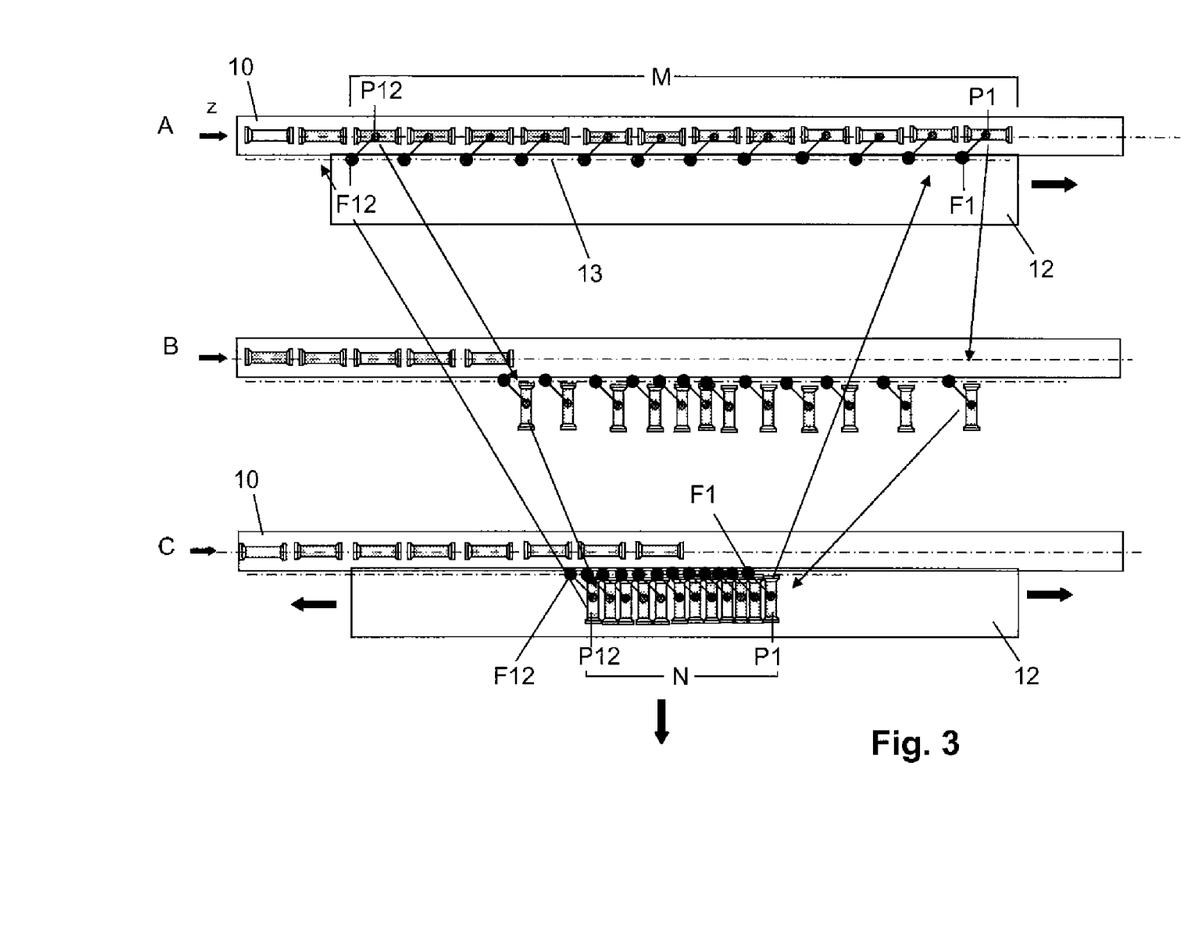
FIG. 3 an arrangement, corresponding to FIG. 2 with overlapping product pick up and product depositing regions to optimize capacity.

The optimization of the system is explained in more detail below with reference to the arrangement which is shown in FIG. 3 and substantially corresponds to the above-described arrangement of FIG. 2.

In principle, the product outlet with respect to the product inlet can be
   directed in the same direction (running in the same direction)
   at a standstill
   oppositely directed (running in the opposite direction)
   located at, for example, a right angle, for example when depositing rows/groups of a plurality of products P on a belt.

The various options for the relative position and running direction of the product outlet with respect to the product inlet are illustrated in step C by the different directions of the arrow.

As a rule, the depositing region N on the discharge conveyor belt 12 is narrower than the pick up region M on the feeder conveyor belt 10, i.e. the products P are generally rotated from a longitudinal direction into a transverse direction. If the products P are rotated from a transverse direction into a longitudinal direction, the pick up region is wider than the depositing region and the considerations for optimizing the mutual arrangement of the depositing region N with respect to the pick up region M are correspondingly valid.

The capacity of the arrangement is determined in particular by the two outermost conveyor elements on the right F1 and left F12, since said conveyor elements cover the greatest distances.

In the example shown in FIG. 3, the products P are moving to the right in the inlet and in the outlet. In this case, it is obvious to connect the depositing region to the pick up region, i.e. the conveyor elements move exclusively to the right from picking up the products to depositing the products. However, this has the consequence that the conveyor elements have to cover a large distance to the left back to the pick up points or pick points thereof.

According to the invention, the pick up region M and the depositing region N are therefore arranged in overlapping manner—as shown in FIG. 3—i.e. the depositing region N is located approximately symmetrically in the center of the pick up region M, or is offset slightly to the right, since the outermost right conveyor element F1 is exposed to the greatest dynamic loading because of an addition reversal of movement and should therefore preferably cover a somewhat shorter distance than the outermost left conveyor element F12.

The movement sequence of the outermost right conveyor element F1 can be characterized as follows:
1. The conveyor element F1 synchronizes at high speed with the product 1 in the direction of the product flow.
2. Reversal of the movement, the conveyor element F1 travels back, since the depositing point thereof is located to the left of the pick up point.
3. The conveyor element F1 accelerates again in the direction of the product flow, but now at the lower depositing speed, and deposits the product P1.
4. The conveyor element F1 moves back to the pick up point or pick position, with virtually no more travel being required here, or at most a short travel forward or back.

The movement sequence of the outermost left conveyor element F12 can be characterized as follows:
1. The conveyor element F12 synchronizes at high speed with the product 12 in the direction of the product flow.
2. The conveyor element F12 moves further in the direction of the product flow, but reduces the speed to the depositing speed, since the depositing point thereof is located to the right of the pick up point, and deposits the product P12.
3. The conveyor element F12 now reverses the direction of movement and moves back to the pick up point or pick position. The distance back is relatively short because of the overlapping arrangement of the product pick up and product depositing regions.

If the depositing region N is displaced further to the right, this is more favorable for the right conveyor element F1, and if said depositing region is displaced again further to the left, this is more favorable for the left conveyor element F12. The optimum region can be determined for a particular application by analysis of the dynamics or by simulation.

The movement distances covered by the two outermost conveyor elements F1 and F12 during a pick up and depositing cycle are illustrated in the drawing by lines with directional arrows.

The remaining conveyor elements F2 . . . F11 move between said two outermost conveyor elements F1 and F12 and are therefore not critical for optimizing the capacity.

Figure 4:
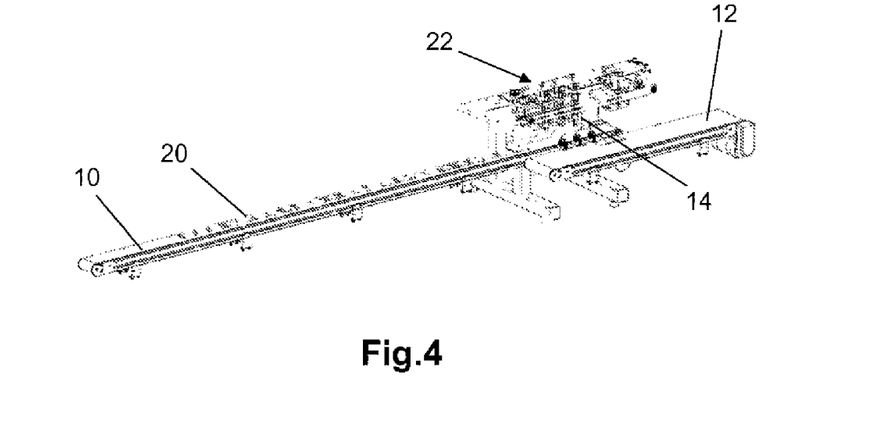
FIG. 4 an oblique view of a third arrangement for transferring products from a feeder conveyor belt to a discharge conveyor belt.
Figure 5:
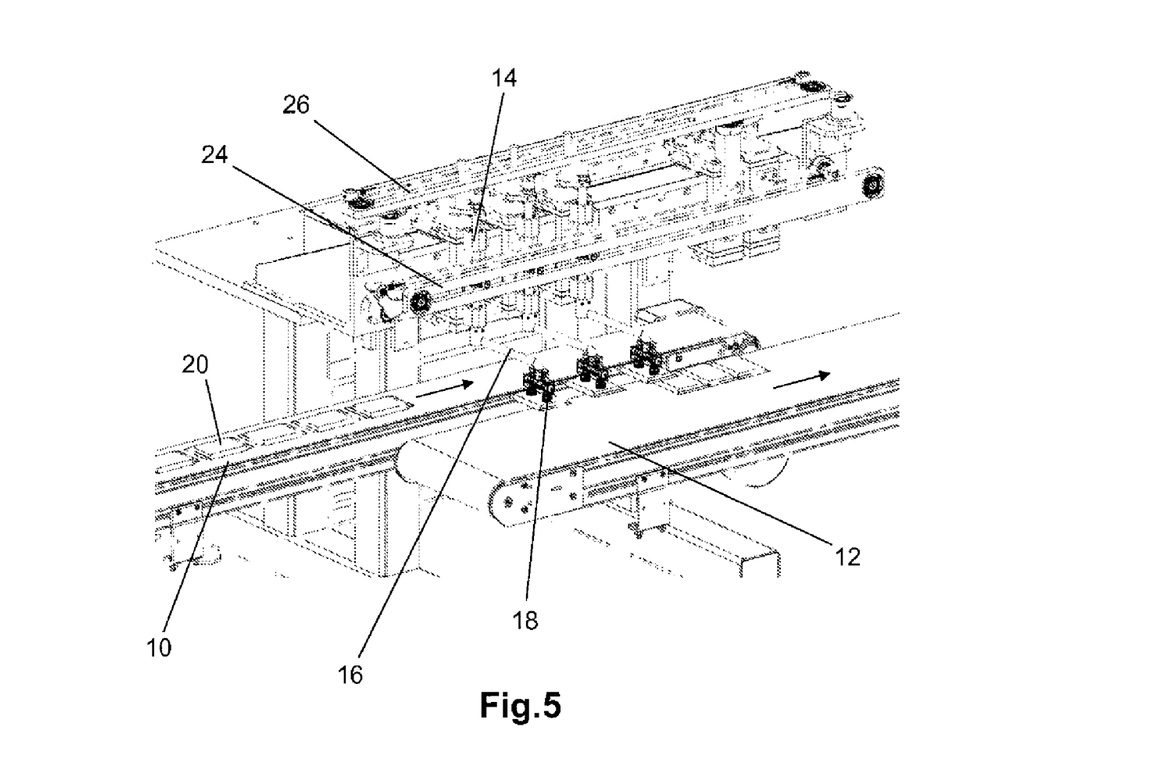
FIG. 5 an oblique view of part of the arrangement from FIG. 4 in an enlarged illustration.
Figure 6:
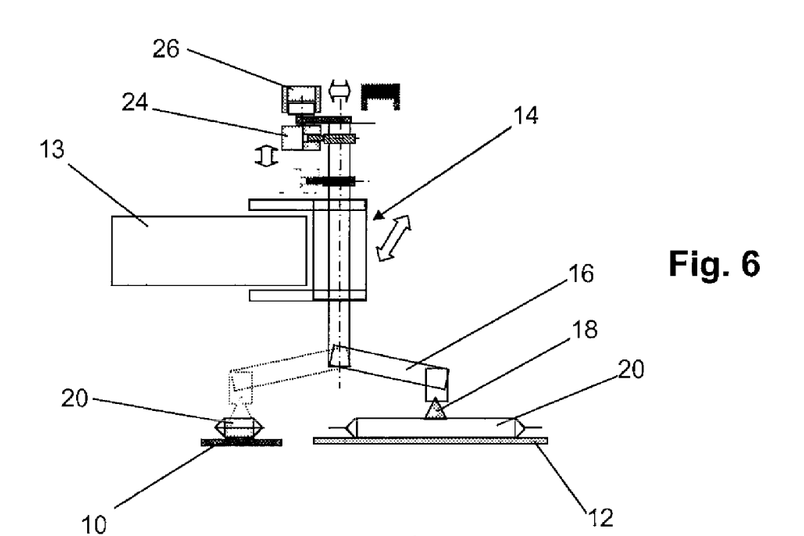
FIG. 6 a side view of a detail of the arrangement from FIG. 4 in the conveying direction of the conveyor belts, in an enlarged illustration.

FIGS. 4, 5 and 6 show an arrangement which corresponds to the arrangements of FIGS. 1 and 2 and has three conveyor elements 14, the lifting and pivoting movement of which takes place via a common link control 22. In the arrangement shown, the conveyor elements 14 have a pivoting mechanism for producing a lift transversally with respect to the transport direction. The raising of the packages 20 using grippers 18 from the feeder conveyor belt 10 and the depositing onto the discharge conveyor belt 12 takes place via a first link control element 24, and the rotation of the pivoting arm 16 takes place via a second link control element 26. The individual conveyor elements 14 can be displaced in a controlled manner independently of one another along the guide section 13 of a linear motor.

Figure 7:
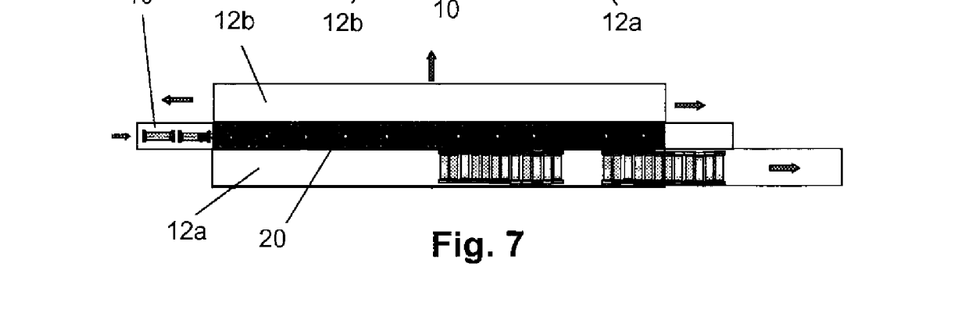
FIG. 7 a top view of an arrangement with two depositing regions.
Figure 8:
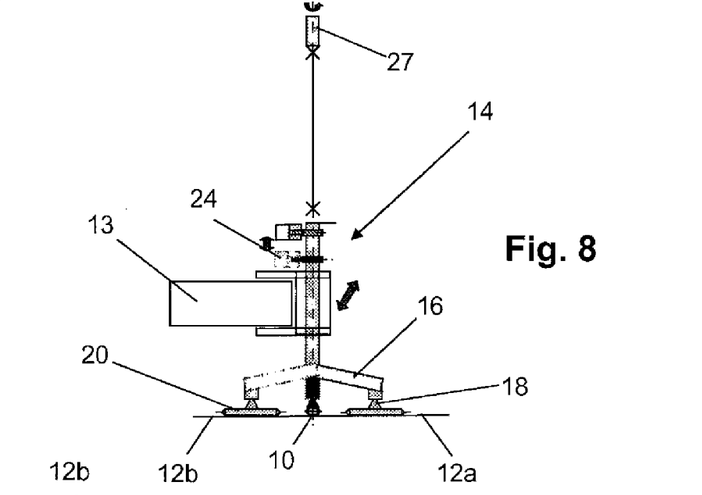
FIG. 8 a side view of a detail of the arrangement from FIG. 7 in the conveying direction of the conveyor belts.

FIGS. 7 and 8 show an alternative of an arrangement with two depositing positions. One discharge conveyor belt 12a, 12b is located on each side of the feeder conveyor belt 10. In the embodiment shown in FIG. 7, the pivoting arm 16 is rotated via a driving unit 27.

Figure 9:
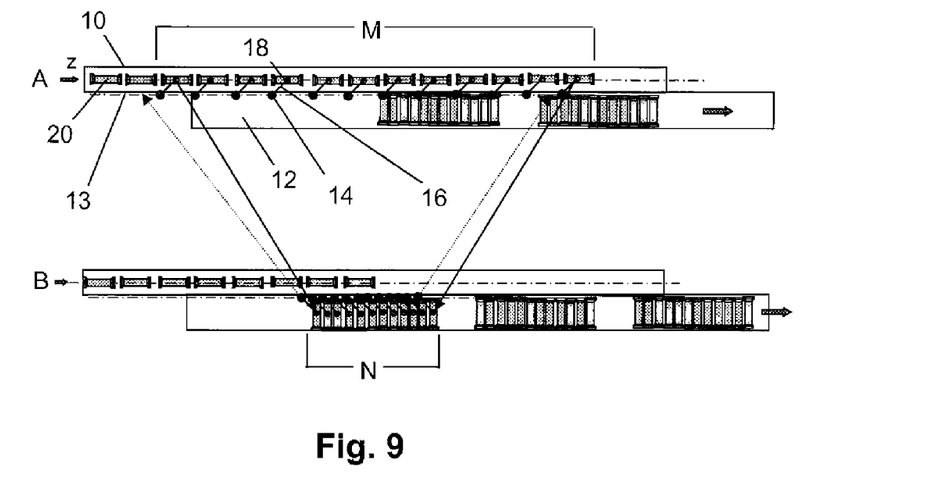
FIG. 9 a simplified illustration of a fifth arrangement for transferring products from a feeder conveyor belt to a discharge conveyor belt.

The arrangement shown in FIG. 9 substantially corresponds to the arrangement of FIG. 2. The twelve conveyor elements 14 use the grippers 18 thereof to simultaneously raise 12 packages 20 from the feeder conveyor belt 10 (A), the pivoting arms 16 are simultaneously pivoted through 90°, and the conveyor elements 14 are moved towards one another in such a manner that the packages 20, which are now aligned in parallel and perpendicularly to the conveying direction of the discharge conveyor belt 12, are in contact laterally. The 12 packages 20 forming a row are deposited onto the discharge conveyor belt 12 (B). The optimization, which has already been described in conjunction with FIG. 3, of the product transfer from the feeder conveyor belt 10 to the discharge conveyor belt 12 by means of reduced movement of the conveyor elements 14 can readily be seen in the drawing.

Figure 10:
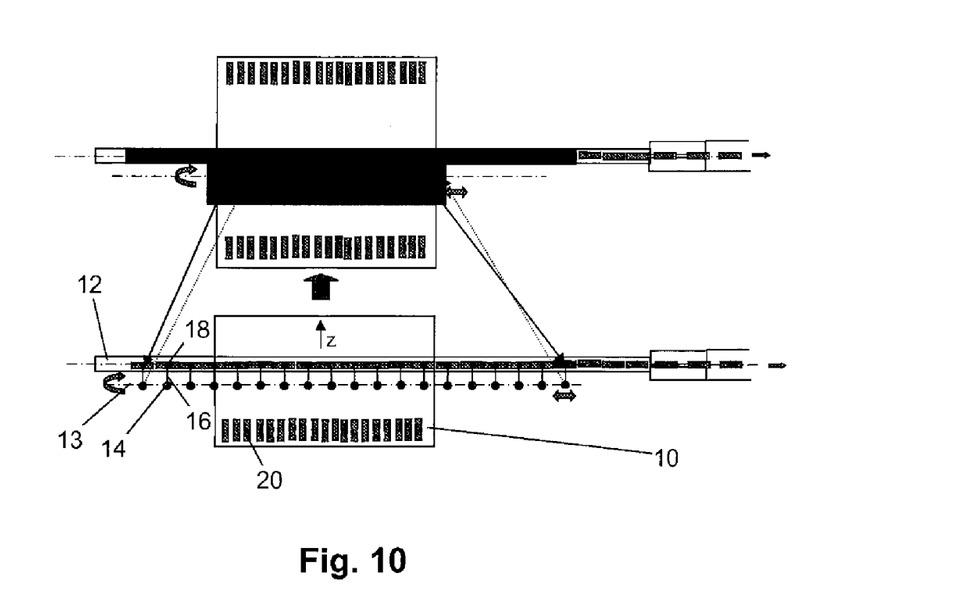
FIG. 10 a simplified illustration of a sixth arrangement for transferring products from a feeder conveyor belt to a discharge conveyor belt.

FIG. 10 shows an arrangement in which the feeder conveyor belt 10 meets the discharge conveyor belt 12 perpendicularly, and in each case a row of 19 products arranged next to one another is simultaneously picked from the feeder conveyor belt 10 by 19 conveyor elements 14 and, after rotation through 90°, deposited simultaneously in a line on the discharge conveyor belt 12. This is apparent from the drawing without the optimum manner of movement of the 19 conveyor elements 14.

Figure 11:
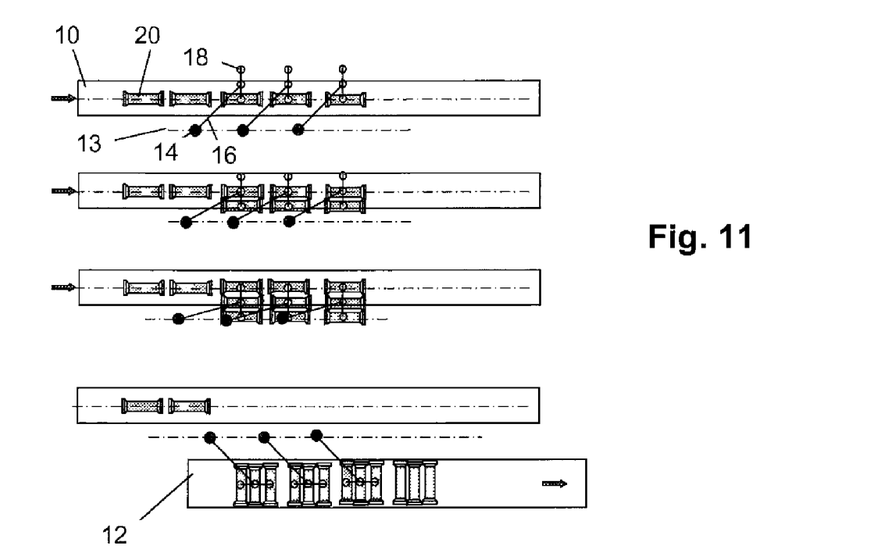
FIG. 11 a simplified illustration of a seventh arrangement for transferring products from a feeder conveyor belt to a discharge conveyor belt.

In the arrangement which is shown in FIG. 11 with a parallel arrangement of the feeder conveyor belt 10 and discharge conveyor belt 12, three conveyor elements 14 can be displaced independently of one another along the guide section 13, which is arranged parallel to the conveyor belts 10, 12, of a linear motor. Each of the three conveyor elements 14 is equipped with a pivoting arm 16 having a triple-action gripper 18. The triple-action grippers 18 pick up one package 20 each three times simultaneously from the feeder conveyor belt 10 (A, B, C), the pivoting arms 16 each being pivoted at the same time for the further picking up of the products. When the triple-action grippers 18 are each occupied with three packages 20, all of the pivoting arms are pivoted simultaneously through 90°, and the packages 20 are deposited, rotated through 90°, in groups of three on the discharge conveyor belt 12 (D).

Figure 12:
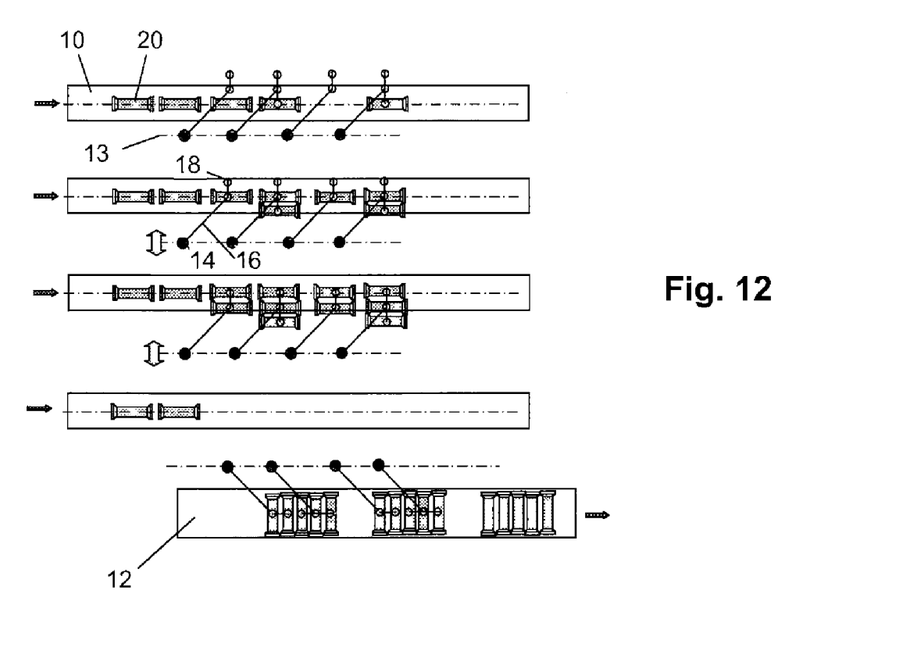
FIG. 12 a simplified illustration of an eighth arrangement for transferring products from a feeder conveyor belt to a discharge conveyor belt.

The arrangement shown in FIG. 12 differs from the arrangement according to FIG. 11 in that, instead of three conveyor elements 14 each having a triple-action gripper 18, there are four conveyor elements 14 having double-action and triple-action grippers 18 in an alternating manner. In the example illustrated, groups of up to five packages 20 are deposited on the discharge conveyor belt 12 by in each case two conveyor elements 14 having double-action and triple-action grippers 18. In order for the packages to be picked up by the multi-action grippers 18, the conveyor elements 14 are each displaced by a corresponding distance perpendicularly to the conveyor belts 10, 12. It can readily be understood from the drawing that, with the combination of two and 3 grippers 18, all configurations having more than two products per group can be formed.

Instead of the picking up, which is shown in FIGS. 11 and 12, of a plurality of products and depositing said products in groups on a plane, a plurality of products can also be picked up by stacking grippers and deposited as a stack.

Figure 13:
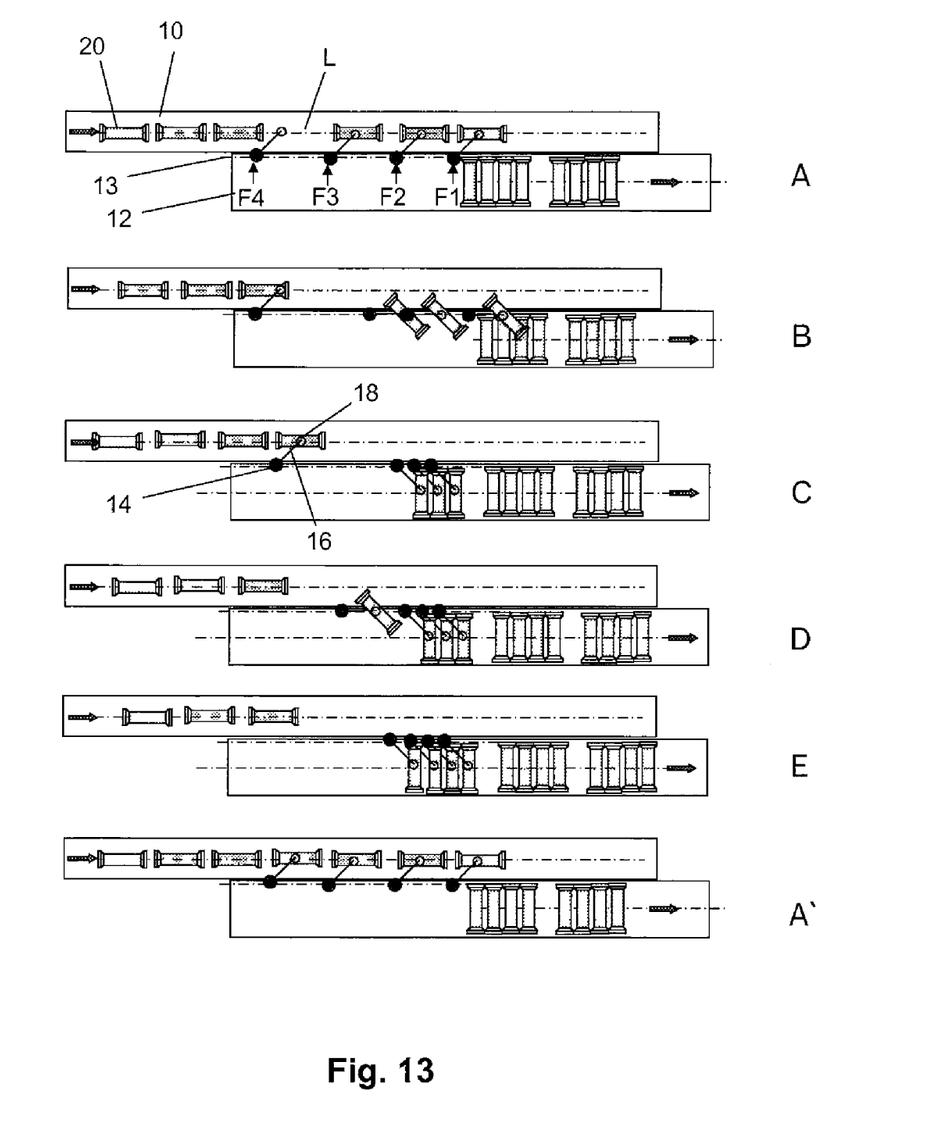
FIG. 13 a first option for processing empty points on a feeder conveyor belt.

It can be seen from FIG. 13 how missing packages or empty points on the feeder conveyor belt 10 are compensated for in an arrangement with a linear motor having a linear guide section 13 and four conveyor elements 14 or pickers F1 . . . F4. In the standard mode, there are no empty points on the feeder conveyor belt 10, and the four conveyor elements 14 use the grippers 18 thereof, which are fastened to pivoting arms 16, to simultaneously raise four consecutive packages 20. In the example shown, there is an empty point L between two packages 20. The pickers F1 . . . F3 are accelerated and synchronized with the associated three packages 20 on the feeder conveyor belt 10 to the right of the empty point L while the picker F4 waits in the starting position (A, B). The three packages 20 are picked, the pickers F1 . . . F3 are pivoted, delayed and remain in a waiting position (C). The picker F1 is subsequently accelerated and synchronized with a package 20 to the left of the empty point L. The package 20 is picked and brought up to the three packages 20 in the waiting position (D, E). The system subsequently runs again in the standard mode (A').

Figure 14:
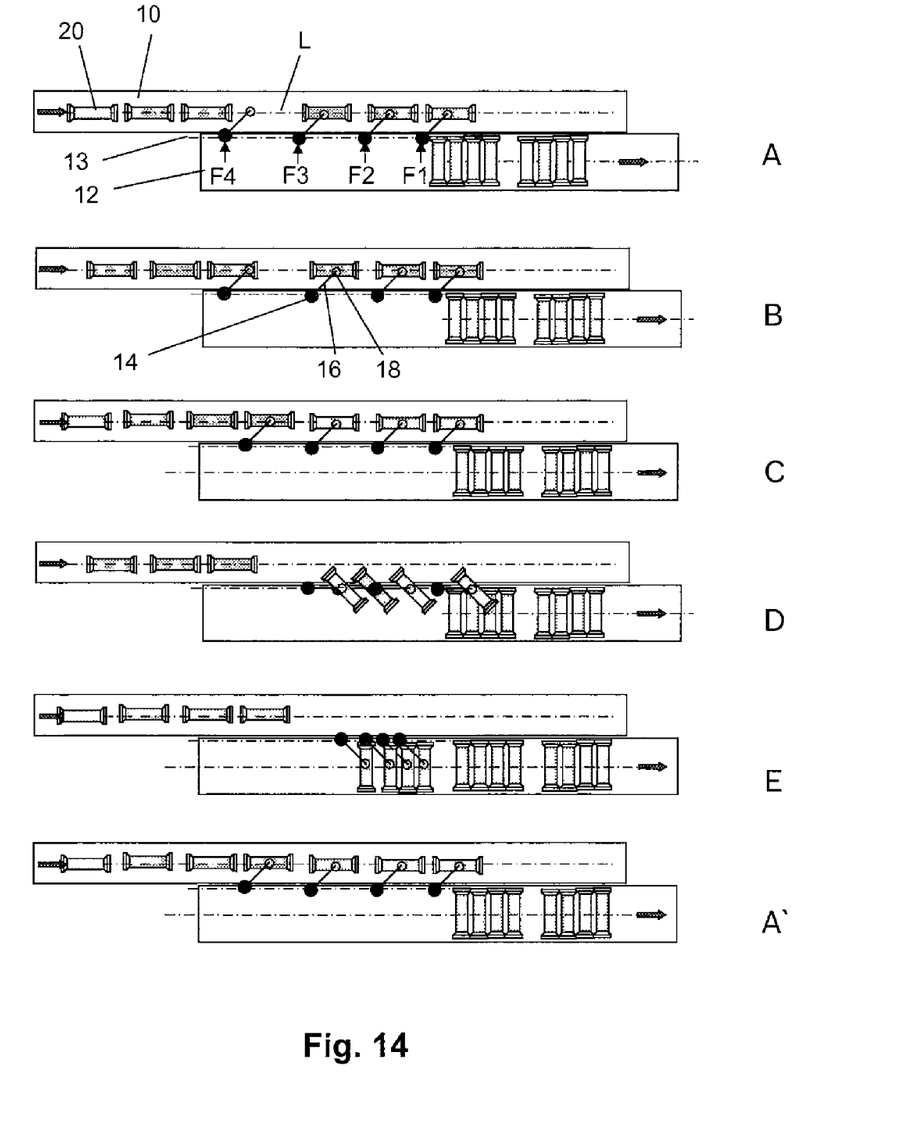
FIG. 14 a second option for processing empty points on a feeder conveyor belt.

In the empty point processing alternative shown in FIG. 14, the pickers F1 . . . F3 are accelerated and synchronized with the associated three packages 20 on the feeder conveyor belt 10 to the right of the empty point L (A). The three packages 20 are picked and the pickers F1 . . . F3 remain in a waiting position (B). The picker F1 is then accelerated and synchronized with a package 20 to the left of the empty point L. The package 20 is picked and brought up to the three packages 20 in the waiting position (C). The pickers F1 . . . F4 are now decelerated and jointly pivoted for depositing the products on the discharge conveyor belt 12 (D, E). The system subsequently runs again in the standard mode (A').

Figure 15:
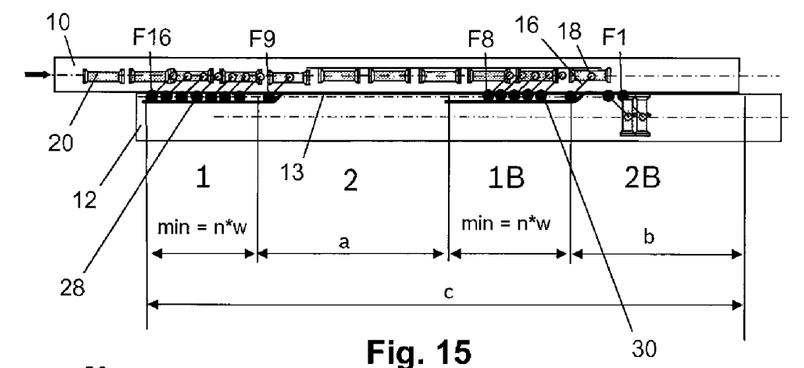
FIG. 15 a simplified illustration of a ninth arrangement for transferring products from a feeder conveyor belt to a discharge conveyor belt.

In the arrangement, which is shown in FIG. 15, with a parallel arrangement of the feeder conveyor belt 10 and discharge conveyor belt 12, sixteen conveyor elements F1 . . . F16 can be displaced independently of one another along the guide section 13 of a linear motor, which guide section is arranged parallel to the conveyor belts 10, 12, and are divided into two picker groups each having eight conveyor elements F1 . . . F8, F9 . . . F16. Each of the sixteen conveyor elements 14 is equipped with a pivoting arm 16 having a gripper 18. The picking and pivoting movement is triggered by fixed radial cams or fixed links 28, 30. The products are therefore picked at defined locations of the mechanism and rotated at a defined location. Since the pick position cannot be changed, each product has to be picked at the precisely correct time, namely when the product in the inlet is located at the pick position. In order to be able to pick all of the products, at least two picker groups having two radial cams 28, 30 have to be used because of the time required for the return movement of the picker groups.

Figure 16:
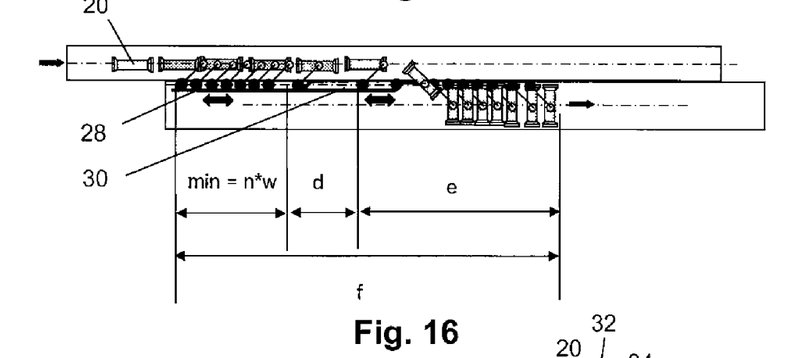
FIG. 16 a simplified illustration of a tenth arrangement for transferring products from a feeder conveyor belt to a discharge conveyor belt.

The arrangement shown in FIG. 16 differs from the arrangement according to FIG. 15 in that the radial cams or links 28, 30 can be displaced along the guide section 13 of the linear motor. The pick and pivoting movement is triggered by the linearly displaceable radial cams 28, 30. The positions at which the products are gripped or deposited can therefore be displaced and adapted to the current product position. A time window for the picking operations is therefore available. In order to be able to pick all of the products, at least two picker groups having two radial cams have to also be used here because of the time required for the return movement of the picker groups. In order to obtain a short design, for each product the pick position is advantageously displaced counter to the product flow direction. The distance d between the two picker groups, and therefore the length of the system, can thus be kept to a minimum without the picker groups colliding. The short overall length means that the pickers also have to cover less distance, and therefore this alternative obtains a greater capacity in comparison to the alternative having fixed radial cams. The arrangement is very compact, and the length f is shorter than the length c in the arrangement according to FIG. 15 having fixed radial cams.

Figure 17:
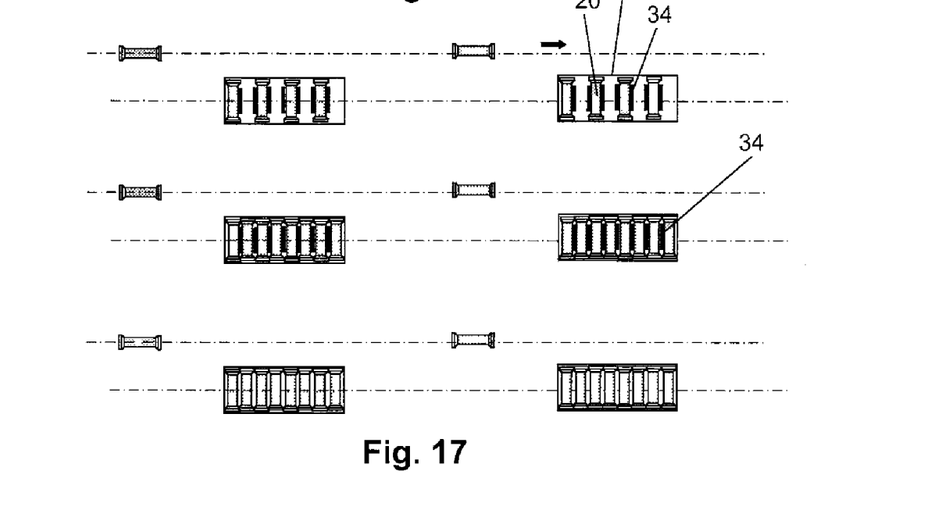
FIG. 17 an alternative for loading trays using separating webs.

FIG. 17 shows an alternative of the loading of trays 32 when direct loading at the desired distance is not possible because the distance is smaller than the width of the conveyor elements or the minimum distance between the conveyor elements. Therefore, for example, in a first step, only every second or every third etc. position is loaded and, subsequently, in a second step or in subsequent steps, the remaining gaps are then loaded. Should the products slip if they are not fixed, it is possible to insert, for example, separating webs 34 which are removed again after the loading, for example by being retracted.

The invention claimed is:

1. A device for transferring products from a feeder conveyor belt (10) to a discharge conveyor belt (12), the device comprising:
a linear motor with conveyor elements (14), which are guided displaceably on a guide and have grippers (18) for temporarily picking up products (20), characterized in that
the guide is a linear guide section (13), and the conveyor elements (14) are displaceable to and fro on the guide section (13) for picking up and depositing the products (20),
when products (20) are supplied consecutively in a line in a conveying direction (z) of the feeder conveyor belt (10), the feeder conveyor belt (10), the discharge conveyor belt (12) and the guide section (13) are arranged parallel next to one another, at least in a lateral overlapping region, and,
when products (20) are supplied in rows next to one another in the conveying direction (z) of the feeder conveyor belt (10), the feeder conveyor belt (10) is arranged perpendicularly to the discharge conveyor belt (12), and the discharge conveyor belt (12) and the guide section (13) are arranged parallel to each other and are arranged next to each other together with the feeder conveyor belt (10), at least in a lateral overlapping region.

2. The device as claimed in claim 1, characterized in that the grippers (18) are arranged on a pivoting arm (16), which is arranged on the conveyor elements (14), in order to produce a displacement movement transversally with respect to the conveying direction (z).

3. The device as claimed in claim 2, characterized in that the pivoting arm (16) is configured to execute a pivoting movement which reduces the required movement distance of the conveyor elements (14) for picking up and depositing the products (20).

4. The device as claimed in claim 1, characterized in that the grippers (18) can be pivoted, raised or lowered simultaneously along the linear guide section (13).

5. The device as claimed in claim 1, characterized in that the grippers (18) can be controlled individually via the linear guide section (13) in order to execute pivoting, lifting and displacement movements.

6. The device as claimed in claim 1, characterized in that the grippers (18) can be pivoted, raised and lowered at predetermined points via fixed links (28, 30).

7. The device as claimed in claim 6, characterized in that at least two groups of grippers (18) can be pivoted, raised and lowered at at least two assigned points.

8. The device as claimed in claim 6, characterized in that the distance (a) between the links (28, 30) or the groups of grippers (18) corresponds at least to the length of the depositing region of the product groups.

9. A device for transferring products from a feeder conveyor belt (10) to a discharge conveyor belt (12), the device comprising:
conveyor elements (14), which are guided displaceably on a guide and have grippers (18) for temporarily picking up products (20), characterized in that
the guide is a linear guide section (13), and the conveyor elements (14) are displaceable to and fro on the guide section (13) for picking up and depositing the products (20),
when products (20) are supplied consecutively in a line in a conveying direction (z) of the feeder conveyor belt (10), the feeder conveyor belt (10), the discharge conveyor belt (12) and the guide section (13) are arranged parallel next to one another, at least in a lateral overlapping region, and,
when products (20) are supplied in rows next to one another in the conveying direction (z) of the feeder conveyor belt (10), the feeder conveyor belt (10) is arranged perpendicularly to the discharge conveyor belt (12), and the discharge conveyor belt (12) and the guide section (13) are arranged parallel to each other and are arranged next to each other together with the feeder conveyor belt (10), at least in a lateral overlapping region,
characterized in that the grippers (18) can be pivoted, raised and lowered at locations defined by displaceable links (28, 30).

10. The device as claimed in claim 1, characterized in that displacement and pivoting movements can be produced by further linear motors or additional displacement elements.

11. The device as claimed in claim 10, characterized in that a gripper (18) is connected to at least two displacement elements.

12. A method for operating a device for transferring products from a feeder conveyor belt (10) to a discharge conveyor belt (12), the device including conveyor elements (14) which are guided displaceably on a guide and have grippers (18) for temporarily picking up products (20), the guide being a linear guide section (13), the method comprising:
displacing the conveyor elements (14) to and fro on the guide section (13) for picking up and depositing the products (20),
when products (20) are supplied consecutively in a line in a conveying direction (z) of the feeder conveyor belt (10), the feeder conveyor belt (10), the discharge conveyor belt (12) and the guide section (13) are arranged parallel next to one another, at least in a lateral overlapping region, and,
when products (20) are supplied in rows next to one another in the conveying direction (z) of the feeder conveyor belt (10), the feeder conveyor belt (10) is arranged perpendicularly to the discharge conveyor belt (12), and the discharge conveyor belt (12) and the guide section (13) are arranged parallel to each other and are arranged next to each other together with the feeder conveyor belt (10), at least in a lateral overlapping region, characterized in that, in order to increase the capacity of the device, the displacement distances of the conveyor elements (14) from product pick up positions to product depositing positions and back are shortened by an overlapping arrangement of a product pick up region (M) and product depositing region (N), the product pick up region (M) and product depositing region (N) preferably having a substantially symmetrical overlapping arrangement.

13. The method as claimed in claim 12, characterized in that product groups are deposited in a plurality of steps, with gaps initially remaining between the products, the gaps being filled in one of the next depositing steps.

14. The method as claimed in claim 13, characterized in that the product depositing region is divided by means of lowerable or removable separating means (34) such that the products cannot be displaced when there are gaps in the depositing positions.

15. The device as claimed in claim 1, characterized in that the grippers (18) can be pivoted, raised or lowered simultaneously via a driving link (22).

16. The device as claimed in claim 1, characterized in that at least two groups of grippers (18) can be pivoted, raised and lowered by at least two assigned links (28, 30).

17. The device as claimed in claim 1, characterized in that a product depositing region (N) is located approximately symmetrically in a center of a product pick up region (M).

18. The method as claimed in claim 1, characterized in that a product depositing region (N) is divided by means of lowerable or removable separating means (34) such that the products cannot be displaced when there are gaps in the depositing positions.

19. The method as claimed in claim 1, characterized in that the conveyor elements (14) can be activated independently of one another.

20. A device for transferring products from a feeder conveyor belt (10) to a discharge conveyor belt (12), the device comprising:

a linear motor with a linear guide section (13) with conveyor elements (14) which are guided displaceably on the linear guide section (13) and have grippers (18) for temporarily picking up products (20), characterized in that the conveyor elements (14) are displaceable to and fro on the guide section (13) for picking up and depositing the products (20), when products (20) are supplied consecutively in a line in a conveying direction (z) of the feeder conveyor belt (10), the feeder conveyor belt (10), the discharge conveyor belt (12) and the guide section (13) are arranged parallel next to one another, at least in a lateral overlapping region, and, when products (20) are supplied in rows next to one another in the conveying direction (z) of the feeder conveyor belt (10), the feeder conveyor belt (10) is arranged perpendicularly to the discharge conveyor belt (12), and the discharge conveyor belt (12) and the guide section (13) are arranged parallel to each other and are arranged next to each other together with the feeder conveyor belt (10), at least in a lateral overlapping region.

\* \* \* \* \*